US008676867B2

(12) United States Patent
Goldsmith et al.

(10) Patent No.: US 8,676,867 B2
(45) Date of Patent: *Mar. 18, 2014

(54) FILE SYSTEM LOCATION VERIFICATION USING A SENTINEL

(75) Inventors: Kevin Scott Goldsmith, Tucson, AZ (US); Robert Guy Vining, Tucson, AZ (US); Gregory Paul Wurth, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/593,035

(22) Filed: Aug. 23, 2012

(65) Prior Publication Data

US 2012/0323980 A1 Dec. 20, 2012

Related U.S. Application Data

(63) Continuation of application No. 12/482,935, filed on Jun. 11, 2009, now Pat. No. 8,326,802.

(51) Int. Cl.
*G06F 17/30* (2006.01)

(52) U.S. Cl.
USPC ........................................... 707/828

(58) Field of Classification Search
USPC ........................................... 707/828
See application file for complete search history.

(56) References Cited

U.S. PATENT DOCUMENTS

| 5,151,989 | A | * | 9/1992 | Johnson et al. ........... 1/1 |
| 5,778,384 | A | * | 7/1998 | Provino et al. ........... 1/1 |
| 5,905,990 | A | | 5/1999 | Inglett |
| 6,119,131 | A | | 9/2000 | Cabrera et al. |
| 6,163,806 | A | * | 12/2000 | Viswanathan et al. ........ 709/229 |
| 6,421,684 | B1 | * | 7/2002 | Cabrera et al. ............... 707/802 |
| 6,477,544 | B1 | * | 11/2002 | Bolosky et al. ........................ 1/1 |
| 6,507,849 | B1 | | 1/2003 | Choudhary |
| 6,654,769 | B2 | | 11/2003 | Ito et al. |
| 6,684,230 | B1 | | 1/2004 | Momoh et al. |
| 6,910,183 | B2 | | 6/2005 | Maier et al. |
| 7,130,868 | B2 | | 10/2006 | Ito et al. |

(Continued)

FOREIGN PATENT DOCUMENTS

WO   2004012379   2/2004

OTHER PUBLICATIONS

PCT International Search Report and Written Opinion dated Oct. 20, 2010 for Application No. PCT/EP2010/057384 filed May 28, 2010.

(Continued)

*Primary Examiner* — Jean M Corrielus
*Assistant Examiner* — Evan Aspinwall
(74) *Attorney, Agent, or Firm* — Rabindranath Dutta; Konrad Raynes Davda & Victor LLP

(57) ABSTRACT

A new file system is mounted to a mount point of an existing file system implemented in a computational system. A sentinel indicator is stored in the mount point. Prior to initiating an input/output (I/O) operation by a program, a determination is made by the program as to whether the sentinel indicator exists. In response to determining by the program that the sentinel indicator exists, the I/O operation is performed by the program. In certain alternative embodiments, in response to determining by the program that the sentinel indicator exists, the I/O operation is not performed by the program.

12 Claims, 9 Drawing Sheets

(56) References Cited

U.S. PATENT DOCUMENTS

| | | | |
|---|---|---|---|
| 7,155,710 | B2 | 12/2006 | Breckner et al. |
| 7,428,556 | B2 * | 9/2008 | Kime ................................. 1/1 |
| 7,440,980 | B2 | 10/2008 | Fletcher et al. |
| 7,444,390 | B2 | 10/2008 | Tadayon et al. |
| 7,752,180 | B1 | 7/2010 | Fair et al. |
| 7,783,665 | B1 * | 8/2010 | Tormasov et al. ............ 707/783 |
| 8,041,735 | B1 * | 10/2011 | Lacapra et al. ............... 707/783 |
| 2002/0016792 | A1 | 2/2002 | Ito et al. |
| 2006/0031269 | A1 | 2/2006 | Gislason |
| 2007/0162419 | A1 * | 7/2007 | Ahn et al. ........................ 707/1 |
| 2007/0198540 | A1 | 8/2007 | Kohl et al. |
| 2007/0220308 | A1 | 9/2007 | Yeung et al. |
| 2009/0254917 | A1 | 10/2009 | Ohtani |
| 2010/0318590 | A1 | 12/2010 | Goldsmith et al. |
| 2011/0295901 | A9 * | 12/2011 | Tormasov ..................... 707/793 |
| 2012/0311002 | A1 * | 12/2012 | Akagawa et al. ............ 707/827 |

OTHER PUBLICATIONS

E. Jones, et al., "Check if a Filesystem is Mounted", nix Documentation Project, Document No. XP002596801, Mar. 28, 2006, pp. 1-8, [online][retrieved Aug. 17, 2010] http://nixforums.org/about140881-check-if-a-filesytem-is-mounted.html>.

R.A. Coyne et al., "The High Performance Storage System", IBM Corporation, ACM, 1993, pp. 83-92.

P. Hope, et al., "Mastering FreeBSD and OpenBSD Security", O'Reilly, Document No. XP002596803, Mar. 28, 2005, pp. 1-2.

K. Nathan, et al., "Hot to Move SuSe Install to a Larger Drive", WebserverTalk Forums, Document No. XP002596802, Jun. 5, 2005, pp. 1-7, [online][retrieved Aug. 17, 2010] http://www.webservertalk.com/printthread.php?      s=44ac19966aa3ed57e310afc0dee43f87&threadid=1083578&perpage=17>.

zman58, et al., "Problem with rsync, crontab and backing up to an external hard-drive", UbuntuForums, Document No. XP002596798, Jul. 19, 2007, pp. 1-4, [online][retrieved Aug. 17, 2010] http://ubuntuforums.org/printthread.php?t=355030>.

R.C. Mahar, et al., "Zenworks Content Respitory", Novell Forums, Document No. XP002596800, Aug. 6, 2008, pp. 1-2, [online][retrieved Aug. 17, 2010] http://forums.novell.com/novell-product-support-forums/zenworks/configuration-management/zcm-imaging/338996-zenworks-content-respitory-print.html>.

D. Wallenstein, "Development Builds Layered on Top of a Stable System by Means of Unionfs", Linux Gazette, Document No. XP002596799, Mar. 1, 2009, pp. 1-5, [online][retrieved Aug. 17, 2010] http://linuxgazette.net/160/wallenstein.html>.

First Office Action dated Aug. 16, 2011, pp. 1-21 for U.S. Appl. No. 12/482,935, filed Jun. 11, 2009.

Response dated Nov. 16, 2011, pp. 1-13, to First Office Action dated Aug. 16, 2011, pp. 1-21 for U.S. Appl. No. 12/482,935, filed Jun. 11, 2009.

Final Office Action dated Mar. 29, 2012, pp. 1-20 for U.S. Appl. No. 12/482,935, filed Jun. 11, 2009.

RCE and Amendment dated May 12, 2012, pp. 1-15 to Final Office Action dated Mar. 29, 2012, pp. 1-20 for U.S. Appl. No. 12/482,935, filed Jun. 11, 2009.

Notice of Allowance dated Jul. 31, 2012, pp. 1-11 for U.S. Appl. No. 12/482,935, filed Jun. 11, 2009.

U.S. Appl. No. Unknown, filed Aug. 23, 2012, entitled "File System Location Verification Using a Sentinel" by inventors K.S. Goldsmith, R.G. Vining, and G.P. Wurth.

Office Action dated Jan. 30, 2013, pp. 1-39 for U.S. Appl. No. 13/593,019, filed Aug. 23, 2012.

Response filed Apr. 11, 2013, pp. 1-10, to Office Action dated Jan. 30, 2013, pp. 1-39 for U.S. Appl. No. 13/593,019, filed Aug. 23, 2012.

Office Action dated Feb. 1, 2013, pp. 1-41 for U.S. Appl. No. 13/593,029, filed Aug. 23, 2012.

Response filed May 7, 2013, pp. 1-11, to Office Action dated Feb. 1, 2013, pp. 1-41 for U.S. Appl. No. 13/593,029, filed Aug. 23, 2012.

Final Office Action dated Jul. 25, 2013, pp. 26, for U.S. Appl. No. 13/593,019, filed Aug. 23, 2012.

Response filed Sep. 25, 2013, pp. 8, to Final Office Action dated Aug. 2, 2013, pp. 26, for U.S. Appl. No. 13/593,019, filed Aug. 23, 2012.

Final Office Action dated Aug. 1, 2013, pp. 26, for U.S. Appl. No. 13/593,029, filed Aug. 23, 2012.

Response filed Oct. 2, 2013, pp. 9, to Final Office Action dated Aug. 2, 2013, pp. 26, for U.S. Appl. No. 13/593,029, filed Aug. 23, 2012.

Notice of Allowance dated Oct. 11, 2013, pp. 11, for U.S. Appl. No. 13/593,019, filed Aug. 23, 2012.

Notice of Allowance dated Oct. 25, 2013, pp. 15, for U.S. Appl. No. 13/593,029, filed Aug. 23, 2012.

* cited by examiner

FILE SYSTEM LOCATION VERIFICATION USING A SENTINEL

CROSS-REFERENCE TO RELATED APPLICATIONS

This application is a continuation of application Ser. No. 12/482,935 filed on Jun. 11, 2009, which is incorporated herein by reference in its entirety.

BACKGROUND

1. Field

The disclosure relates to a method, a system, and a computer program product for verification of a file system location by using a sentinel.

2. Background

In UNIX* file system hierarchies a tree structure may exist, wherein the tree structure comprises of directories and files. A directory may include other directories and files, wherein the other directories that are included in a directory may be referred to as subdirectories. The top level directory of the UNIX file system may be referred to as the root or the root directory.

*UNIX is a trademark or registered trademark of The Open Group.

Additionally, in UNIX file systems, the capability exists to mount other file systems into the root of the UNIX file system hierarchy at a "mount point" or at "mount points" within previously mounted file systems. The "mount point" is a specific directory location within the overall UNIX file system hierarchy. This mechanism allows an administrator to construct a flexible and expandable UNIX file system hierarchy which includes a number of mounted file systems that can be local or remote, wherein the remote files systems may include Network File System (NFS) mounted file systems. End users at a command prompt and application programs may see one complete UNIX file system hierarchy and may be unaware as to which specific directories are within which mounted file systems.

SUMMARY OF THE PREFERRED EMBODIMENTS

Provided are a method, a system, and an computer program product in which a new file system is mounted to a mount point of an existing file system implemented in a computational system. A sentinel indicator is stored in the mount point. Prior to initiating an input/output (I/O) operation by a program, a determination is made by the program as to whether the sentinel indicator exists. In response to determining by the program that the sentinel indicator exists, the I/O operation is performed by the program. In certain alternative embodiments, in response to determining by the program that the sentinel indicator exists, the I/O operation is not performed by the program.

In certain additional embodiments, the new file system is unmounted. Prior to initiating another I/O operation by the program, the program determines whether the sentinel indicator exists. In response to determining that the sentinel indicator does not exist, an error is returned.

In certain embodiments, the sentinel indicator is a file.

In further embodiments, the existing file system is a hierarchical file system with a root directory that is a top level file system. The mount point is a directory or a subdirectory of the root directory. Furthermore, in response to the new file system being mounted to the mount point, one or more previously existing files of the existing file system are no longer visible to the program.

In certain other embodiments, the sentinel indicator is a directory.

BRIEF DESCRIPTION OF THE DRAWINGS

Referring now to the drawings in which like reference numbers represent corresponding parts throughout.

DETAILED DESCRIPTION

Figure 1:
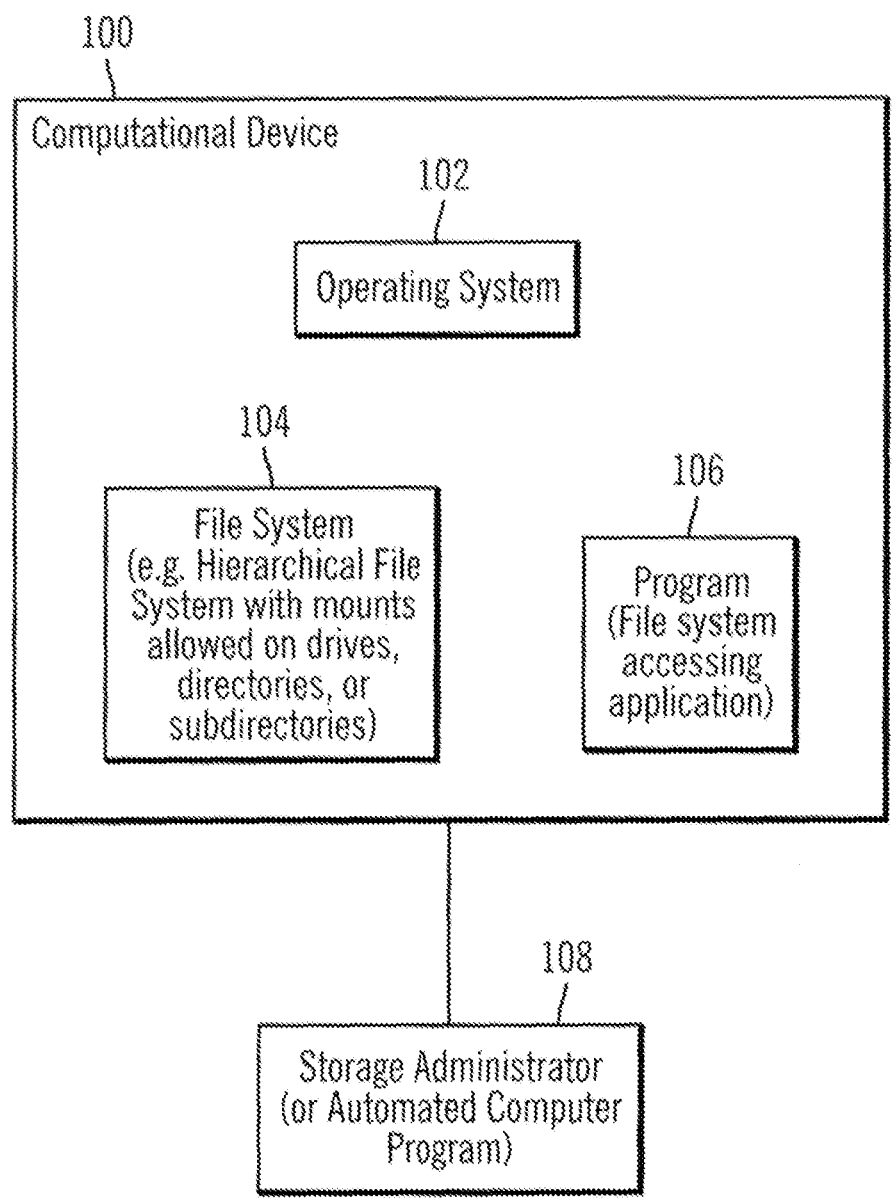
FIG. 1 illustrates a block diagram of an exemplary computational device, in accordance with certain embodiments.

In the following description, reference is made to the accompanying drawings which form a part hereof and which illustrate several embodiments. It is understood that other embodiments may be utilized and structural and operational changes may be made.

Mount Points, Sentinel Generation, and Usage of Sentinel

Given the possibility that any directory within a UNIX file system hierarchy may be a "mount point" or not be a "mount point", it is possible that any given specific directory location in the overall UNIX file system hierarchy may either be within a selected mounted file system or not within the selected mounted file system. A "mount point" may be in one of two possible states. In a first state, a file system is not mounted at the "mount point". In a second state, a file system is mounted at the "mount point". Mounting a file system at a "mount point" has the effect of hiding or obscuring the existing contents (i.e., files and/or subdirectories) that exist at the "mount point", and mounting the file system at the "mount point" makes only the mounted file system visible. When the file system is unmounted the previous contents may be visible once again. Furthermore, any file system may potentially be mounted at a given "mount point".

Wherever there is a possibility of mounting or unmounting of file systems, the potential exists that at any given point in time the overall UNIX file system hierarchy is not in the state that the UNIX file system was intended to be in by the UNIX file system administrator. Procedures for mounting the file systems may be manual rather than automated (for example, during the boot of the operating system). Anytime, a manual mount is required, the potential for neglecting to perform the corresponding unmount may exist. In addition, file systems may be unmounted for a number of reasons, such as to perform maintenance (i.e. a backup). In certain situations, the wrong file system may be mistakenly mounted at a given "mount point".

All of these possibilities can create difficulties for end users and applications that attempt to access files and directories in the UNIX file system hierarchy. The files or directories that are to be accessed may or may not be present in the properly mounted file systems as anticipated. However, in some cases end users and applications may be operating on known specific directory locations and may not be able to determine whether the intended file system has been mounted or not, and such situations may lead to erroneous and unexpected results. These include the following possibilities:

(i) Attempting to locate or read a file at a specific directory location which is intended to be within a mounted file system, but the file system is not currently mounted. As a result, the file cannot be located or read.

(ii) Attempting to write a file at a specific directory location which is intended to be within a mounted file system, but the file system is not currently mounted. As a result, the file is written, but a later mount of the file system obscures the file that has been written making the file inaccessible; and (iii) Attempting to write a file at a specific directory location which is intended to be within a mounted file system, but the wrong file system is currently mounted. As a result, the file may be written, but then the UNIX administrator may unmount the wrong file system and mount the correct file system making the file that has been written inaccessible.

Certain embodiments provide a mechanism for an end user or application to ensure that the contents of a specific file system location are in an intended configuration.

In certain embodiments, when a program is dependent on a specific directory being at or within a mounted file system, the program can mandate the existence of a predetermined sentinel at the directory location. When a storage administrator is configuring the directory location within the mounted file system on behalf of the program, the administrator may be responsible for the creation of the sentinel. When the program is performing Input/Output (I/O) operations to the configured location, the program may first verify the existence of the sentinel. If the sentinel is present, the program can be assured that the location is where the administrator wanted the I/O to occur. If the sentinel is not present, the program will ensure the failure of all I/O operations.

In certain embodiments, the program is assured that the program is performing I/O in the location desired by the administrator as a result of the confirmation of the existence of the sentinel. This prevents lost time in problem determination that may be necessary if the data was not in the specified location as a result of the file system not being mounted.

Exemplary Embodiments

FIG. 1 illustrates a block diagram of an exemplary computational device 100, in accordance with certain embodiments.

The computational device 100 may comprise any suitable computational device comprising one or more of a mainframe, a personal computer, a midrange computer, a telephony device, a server, a client computer, a handheld computer, a laptop, a palmtop computer, etc.

The computational device 100 includes an operating system 102, a file system 104 and a program 106. The operating system 102 may by any exemplary operating system, such as the UNIX operating system. In an exemplary embodiment the file system 104 may comprise a hierarchical file system in which mounts are allowed on drives, directories or subdirectories. The program 106 may comprise an application that accesses files and directories stored in the file system 104.

A storage administrator 108 may interact with the computational device 100 via an exemplary command line interface or a graphical user interface and manage the file system 104. In certain embodiments, an automated computer program may perform the operations performed by the storage administrator 108.

Figure 2:
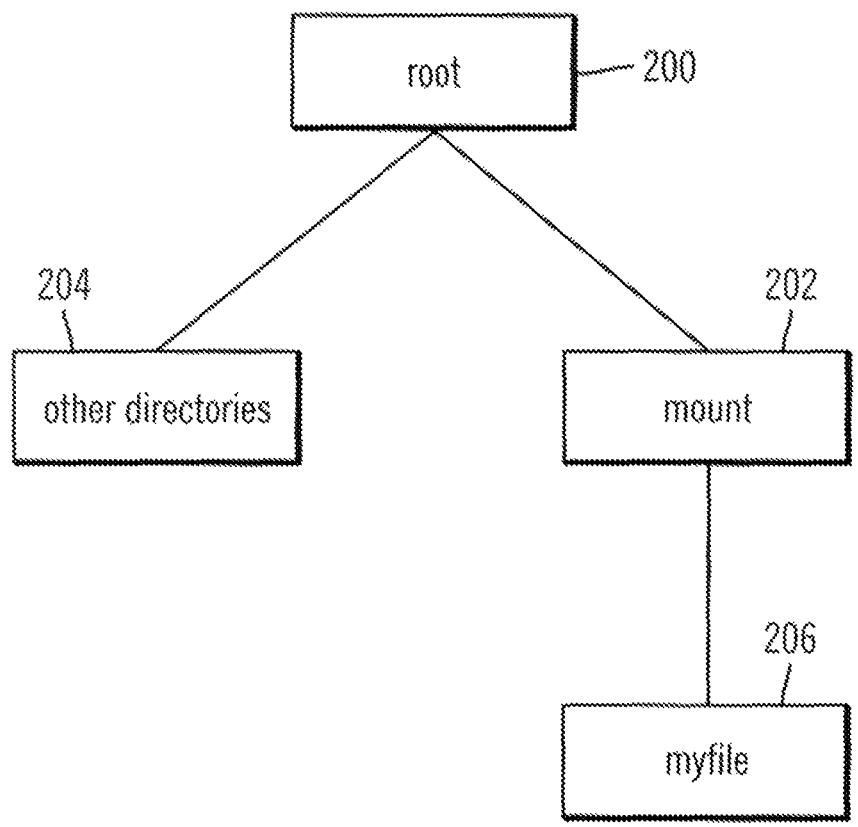
FIG. 2 illustrates a block diagram that shows a root directory with a mount subdirectory, in accordance with certain embodiments.

FIG. 2 illustrates a block diagram that shows a root directory 200 with a subdirectory referred to as a mount directory 202 implemented in the file system 104 of the computational device 100, in accordance with certain embodiments. The root directory 200 may include other subdirectories 204. The mount directory 202 may include an exemplary file named "myfile" 206 and no new file system has been mounted to the mount directory 202. In such embodiments, the file named "myfile" 206 is accessible to the program 106.

Figure 3:
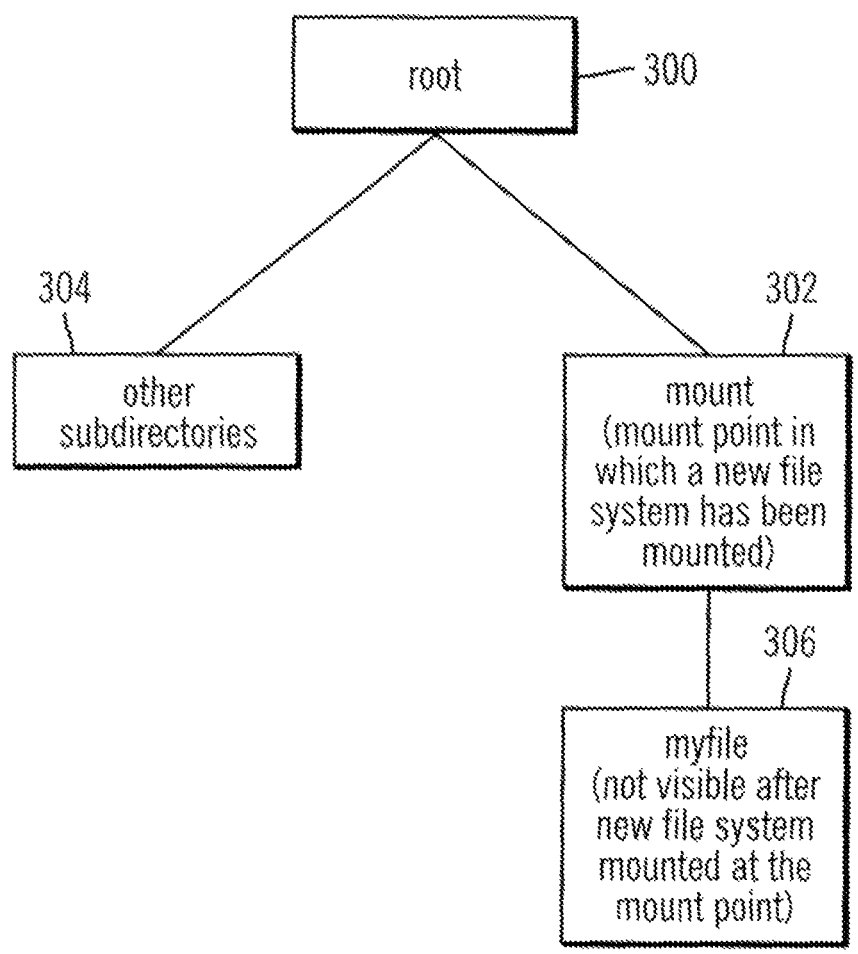
FIG. 3 illustrates a block diagram that shows a root directory with a mount subdirectory which is a mount point for a new file system, in accordance with certain embodiments.

FIG. 3 illustrates a block diagram that shows a root directory 300 with a subdirectory referred to as a mount directory 302 implemented in the file system 104 of the computational device 100, in accordance with certain embodiments. The root directory 300 may include other subdirectories 304. The mount directory 202 may include an exemplary file named "myfile" 306. In FIG. 3, a new file system has been mounted in the mount directory 302. In such embodiments, the file named "myfile" 306 is no longer accessible to the program 106.

Figure 4:
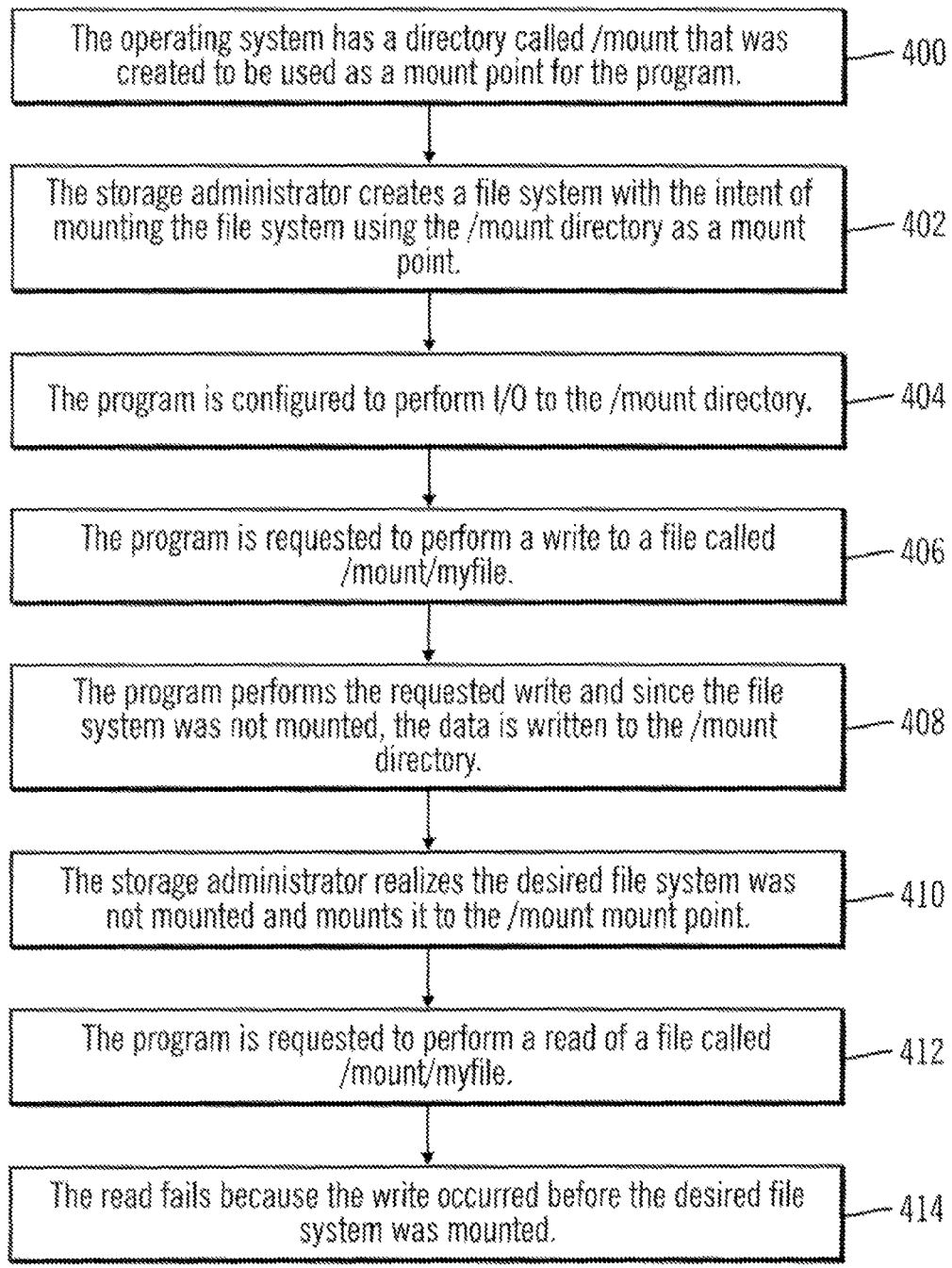
FIG. 4 illustrates a flowchart that shows first operations implemented in the computational device of FIG. 1, wherein no sentinel indicator is used, in accordance with certain embodiments.

FIG. 4 illustrates a flowchart that shows first operations implemented in the computational device 100 of FIG. 1, wherein no sentinel indicator is used, in accordance with certain embodiments.

Control starts at block 400, in which the file system 104 has a directory called /mount (reference numeral 302 of FIG. 3, wherein "/mount" is an exemplary notation that denotes the mount directory 302) that was created in order to be used as a mount point for a new file system for the program 106. The storage administrator 108 creates (at block 402) a file system with the intent of mounting the files system using the /mount directory 302 as a mount point The program 106 is configured (at block 404) to perform I/O to the /mount directory 302. The program 106 is requested (at block 406) to perform a write to a file called /mount/myfile. The program 106 performs (at block 408) the requested write and since the file system was not mounted, the data is written to the /mount directory (the location where the data is written is shown by reference numeral 306 in FIG. 3).

The storage administrator 108 realizes (at block 410) that the desired new file system was not mounted and mounts the desired file system to the /mount mount point 302. The program 106 is requested (at block 412) to perform a read of a file called /mount/myfile. The read fails (at block 414) because the write occurred (at block 408) before the desired file system was mounted.

Figure 5:
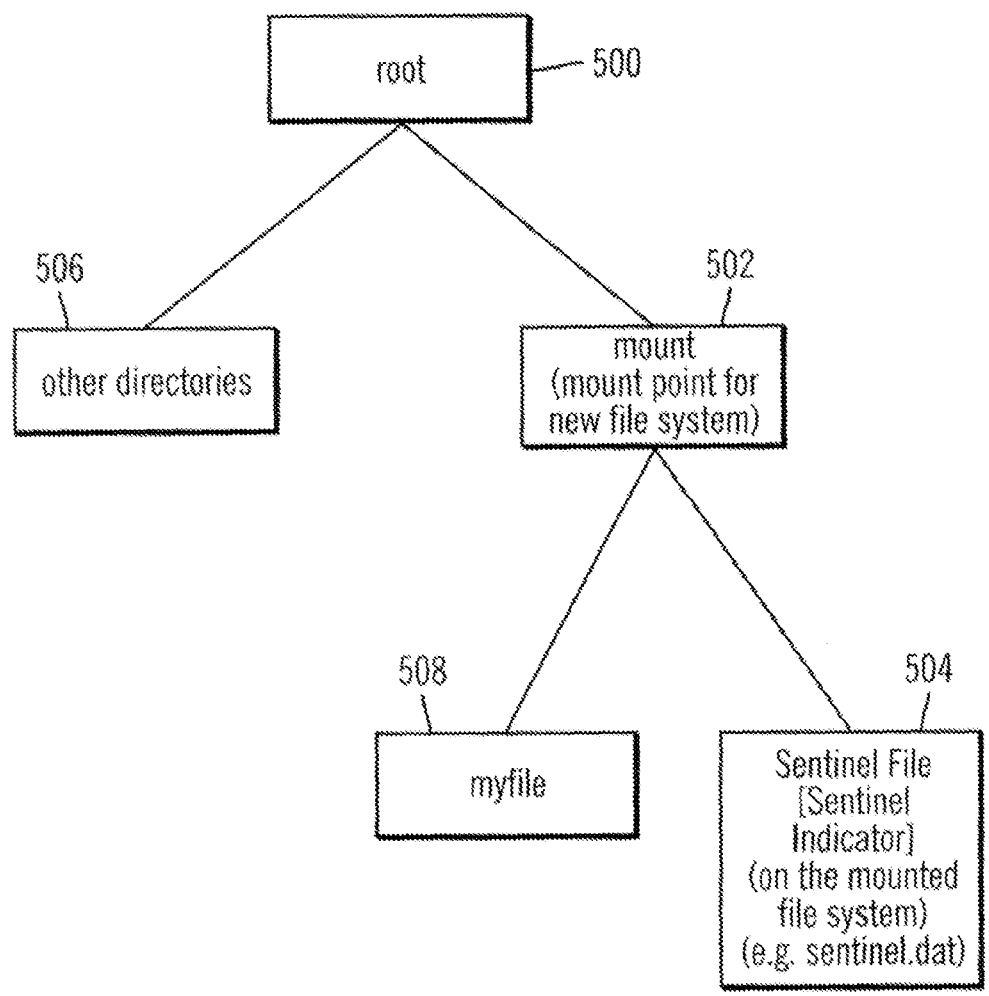
FIG. 5 illustrates a block diagram that shows a root directory with a mount subdirectory that has a sentinel file included in the mount subdirectory, in accordance with certain embodiments.

FIG. 5 illustrates a block diagram that shows a root directory 500 with a subdirectory referred to as a mount directory 502, wherein a sentinel file 504 is included in the mount directory 502, in accordance with certain embodiments. The file myfile 508 is a file within a new file system mounted at the mount directory 502. In certain exemplary embodiments, the sentinel file may be a file named sentinel.dat. The root directory 500 may include other subdirectories 506.

Figure 6:
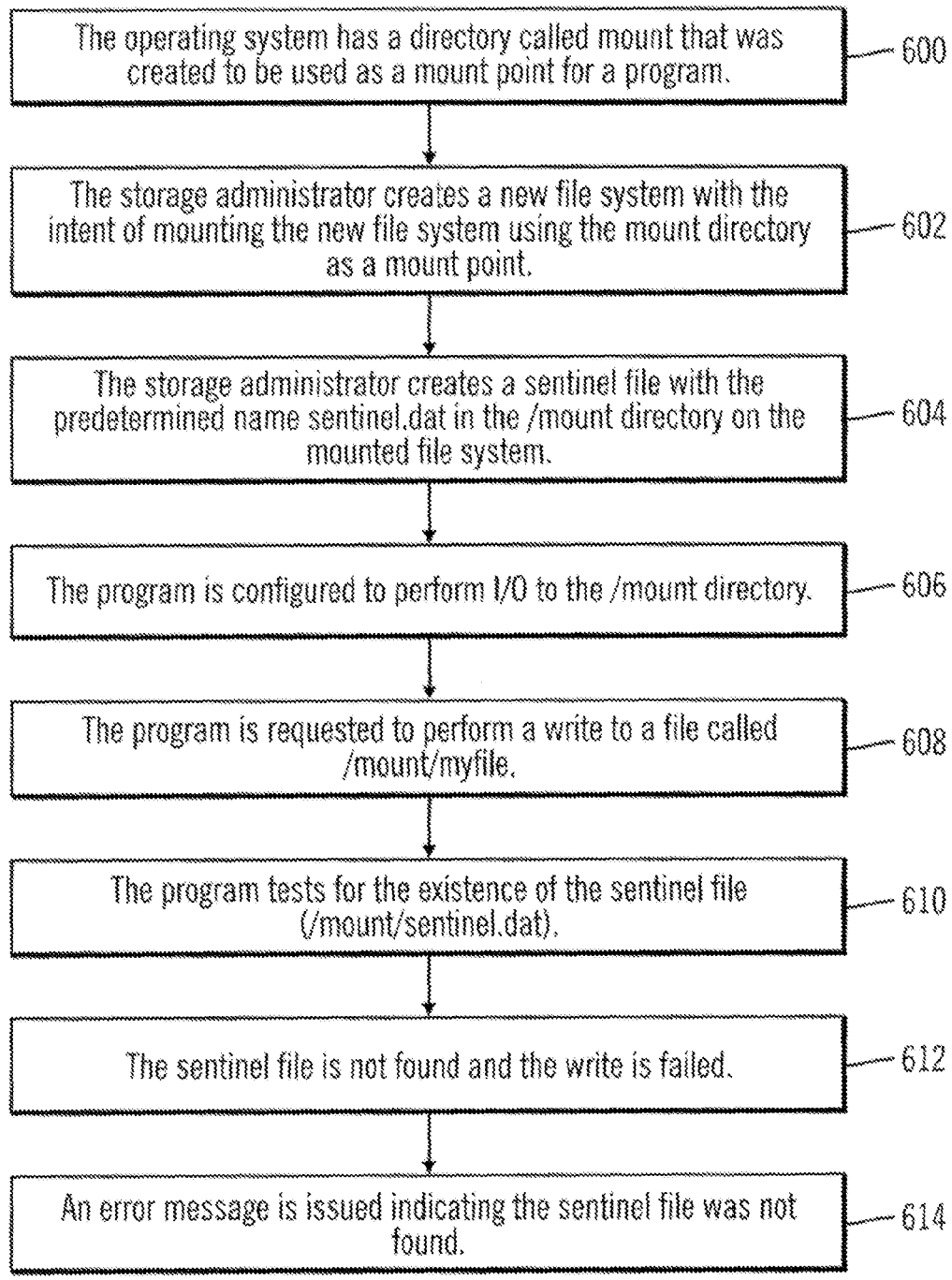
FIG. 6 illustrates a flowchart that shows second operations implemented in the computational device of FIG. 1 in which a sentinel file is used, in accordance with certain embodiments.

FIG. 6 illustrates a flowchart that shows second operations implemented in the computational device 100 of FIG. 1 in which the sentinel file 504 is used, in accordance with certain embodiments;

Control starts at block 600, in which the file system 104 has a directory called /mount 502 that was created to be used as a mount point for the program 106. The storage administrator 108 creates (at block 602) a new file system with the intent of mounting the new file system by using the /mount directory 502 as a mount point The storage administrator 108 creates (at block 604) a sentinel file 504 with the predetermined name sentinel.dat in the /mount directory 502 on the mounted new file system.

The program 106 is configured (at block 606) to perform I/O to the /mount directory 502. The program 106 is requested (at block 608) to perform a write to a file called /mount/myfile. The program 106 tests (at block 610) for the existence of the sentinel file (/mount/sentinel.dat) 504. In certain embodiments, in which the new file system has been unmounted, the sentinel file is not found (at block 612) and the write fails. An error message is issued (at block 614) indicating the sentinel file was not found.

Figure 7:
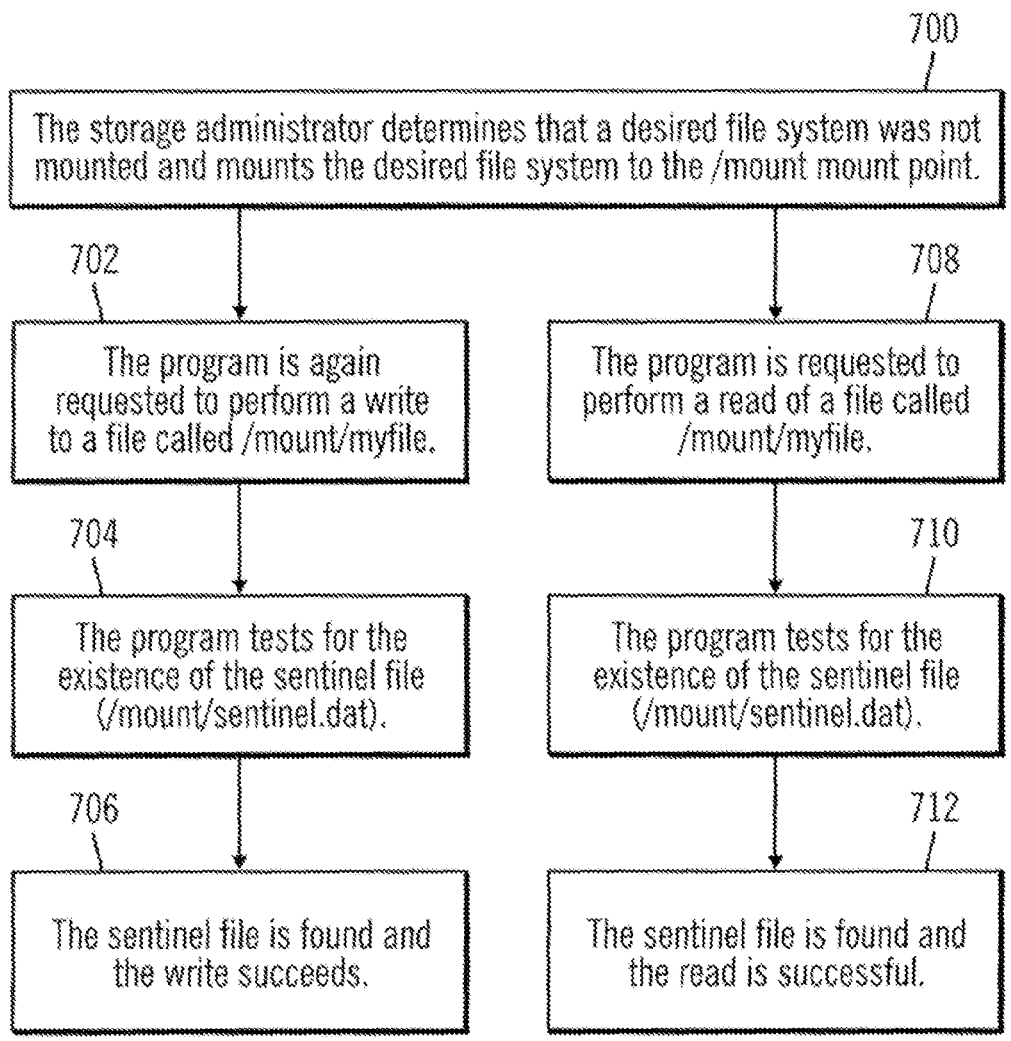
FIG. 7 illustrates a flowchart that shows third operations implemented in the computational device of FIG. 1 in which a sentinel file is used, in accordance with certain embodiments.

FIG. 7 illustrates a flowchart that shows third operations implemented in the computational device 100 of FIG. 1 in which a sentinel file 502 is used, in accordance with certain embodiments.

Control starts at block 700, in which the storage administrator 108 realizes from an error message (e.g., error message generated in block 614 of FIG. 6) that a desired file system was not mounted and mounts the desired file system to the /mount 502 mount point. From block 700 control may proceed to either block 702 or block 708.

The program 106 is requested (at block 702) to perform a write to a file called /mount/myfile. The program 106 tests (at block 704) for the existence of the sentinel file 504 (/mount/sentinel.dat). The sentinel file 504 is found (at block 706) and the write succeeds The program is requested (at block 708) to perform a read of a file called /mount/myfile. The program tests (at block 710) for the existence of the sentinel file 504 (/mount/sentinel.dat). The sentinel file is found (at block 712) and the read is successful.

In the operations shown in FIGS. 6 and 7, the storage administrator 108 created the sentinel file 504 that clearly identified that location as the intended location for I/O. The testing prior to subsequent I/O operations allow the program 106 to be certain that the program was reading from or writing to the correct location.

Figure 8:
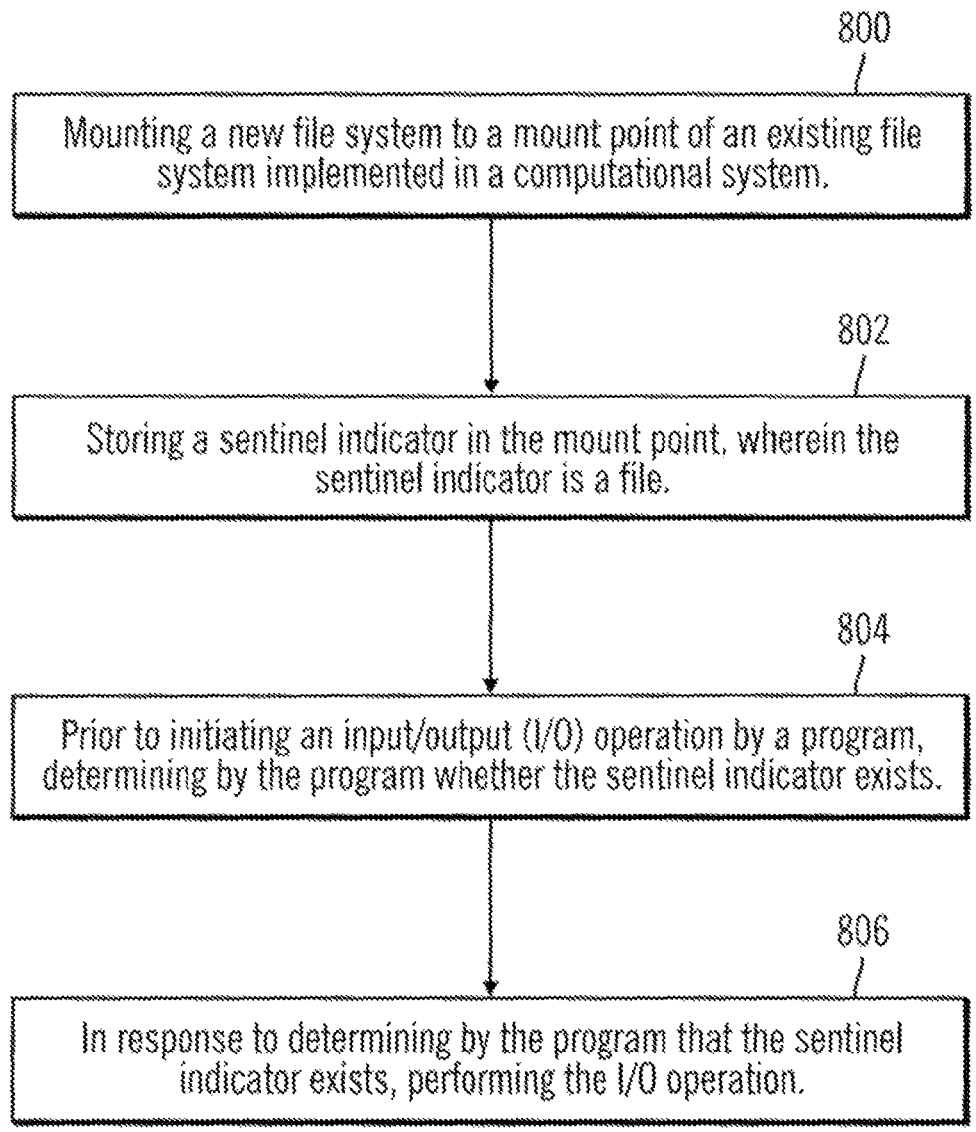
FIG. 8 illustrates a flowchart that shows fourth operations implemented in the computational device of FIG. 1 in which a sentinel file is used, in accordance with certain embodiments.

FIG. 8 illustrates a flowchart that shows fourth operations implemented in the computational device 100 of FIG. 1 in which a sentinel file is used, in accordance with certain embodiments.

Control starts at block 800 in which a new file system is mounted to a mount point 502 of an existing file system 104 implemented in a computational system 100. A sentinel indicator 504 is stored (at block 802) in the mount point 502. In certain embodiments, the sentinel indicator is a file and in other embodiments the sentinel indictor is a directory. Prior to initiating an input/output (I/O) operation by a program 106, a determination is made (at block 804) by the program 106 as to whether the sentinel indicator 504 exists. In response to determining by the program 106 that the sentinel indicator exists, the I/O operation is performed (at block 806) by the program 106. In certain alternative embodiments, in response to determining by the program 10 that the sentinel indicator exists, the I/O operation is not performed by the program 106.

In certain additional embodiments, the new file system is unmounted. Prior to initiating another I/O operation by the program 106, the program 106 determines whether the sentinel indicator 504 exists. In response to determining that the sentinel indicator 504 does not exist, an error is returned.

In further embodiments, the existing file system is a hierarchical file system with a root directory 500 that is a top level file system. The mount point 502 is a directory or a subdirectory of the root directory 500. Furthermore, in response to the new file system being mounted to the mount point, one or more previously existing files of the existing file system are no longer visible to the program 106.

Therefore, FIGS. 1-8 illustrate certain embodiments in which a storage administrator 108 creates a sentinel file in the directory and on the file system where I/O is desired. When a program 106 is required to perform I/O to the directory, a test is performed to ensure the existence of the sentinel. If the sentinel is found, the I/O is carried out. If the sentinel is not found, the I/O is failed and a message or error code is presented to indicate that the target location contents are not as expected based on configurations made by the storage administrator 108.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

*Java is a trademark or registered trademark of Sun Microsystems, Inc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
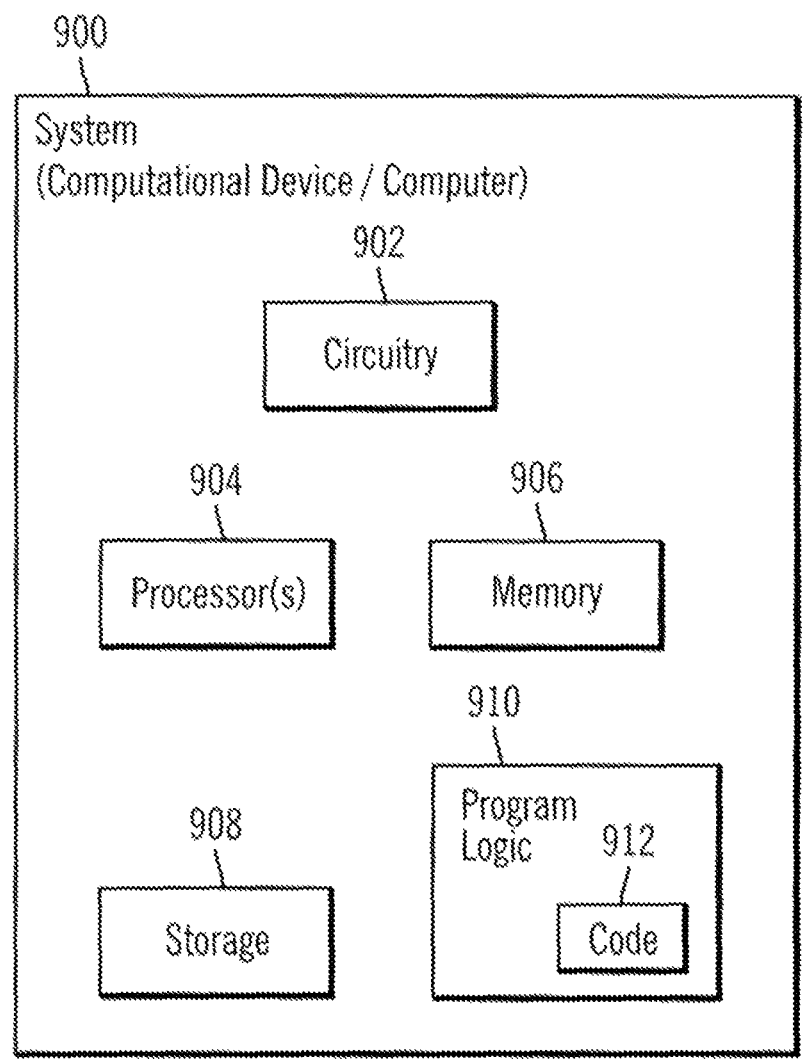
FIG. 9 illustrates a block diagram of a computational system that shows certain elements that may be included in the computational device of FIG. 1, in accordance with certain embodiments.

FIG. 9 illustrates a block diagram that shows certain elements that may be included in the system 900 in accordance with certain embodiments. The system 100 may comprise the computational device 100, and may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures, show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
mounting, by a processor, a new file system to a subdirectory of an existing file system implemented in a computational system;
storing a sentinel indicator in the subdirectory, wherein the sentinel indicator is created by an automated program, wherein all sentinel indicators are referred to by an identical filename and an identical filename extension, and wherein the sentinel indicator and at least one other file are stored in the subdirectory that comprises a mount point of the new file system;
in response to determining by a program that the sentinel indicator exists in the subdirectory, performing an input/output (I/O) operation by the program.

2. The method of claim 1, wherein the subdirectory includes at least two files including the sentinel indicator and another file that is a file of the new file system.

3. A method, comprising:
mounting, by a processor, a new file system to a subdirectory of an existing file system implemented in a computational system;
storing a sentinel indicator in the subdirectory, wherein all sentinel indicators are referred to by an identical filename and an identical filename extension, and wherein the sentinel indicator and at least one other file are stored in the subdirectory that comprises a mount point of the new file system; and
in response to determining by a program that the sentinel indicator exists in the subdirectory, performing an input/output (I/O) operation by the program, wherein the identical filename and the identical filename extension are predetermined and are made available to programs that execute in the computational system to determine whether the sentinel indicator exists.

4. The method of claim 3, the method further comprising:
in response to determining by the program that the sentinel indicator does not exist in the subdirectory, avoiding performing the I/O operation by the program.

5. A computer program product for verification of a file system location, the computer program product comprising:
a non-transitory computer readable storage medium having computer readable program code embodied therewith, the computer readable program code configured to perform operations on a processor, the operations comprising:
mounting a new file system to a subdirectory of an existing file system;
storing a sentinel indicator in the subdirectory, wherein the sentinel indicator is created by an automated program, wherein all sentinel indicators are referred to by an identical filename and an identical filename extension, and wherein the sentinel indicator and at least one other file are stored in the subdirectory that comprises a mount point of the new file system; and
in response to determining by a program that the sentinel indicator exists in the subdirectory, performing an input/output (I/O) operation by the program.

6. The computer program product of claim 5, wherein the subdirectory includes at least two files including the sentinel indicator and another file that is a file of the new file system.

7. A computer program product for verification of a file system location, the computer program product comprising:
a non-transitory computer readable storage medium having computer readable program code embodied therewith, the computer readable program code configured to perform operations on a processor, the operations comprising:
mounting a new file system to a subdirectory of an existing file system;
storing a sentinel indicator in the subdirectory, wherein all sentinel indicators are referred to by an identical filename and an identical filename extension, and wherein the sentinel indicator and at least one other file are stored in the subdirectory that comprises a mount point of the new file system; and
in response to determining by a program that the sentinel indicator exists in the subdirectory, performing an input/output (I/O) operation by the program, wherein the identical filename and the identical filename extension are predetermined and are made available to programs to determine whether the sentinel indicator exists.

8. The computer program product of claim 7, the operations further comprising:
in response to determining by the program that the sentinel indicator does not exist in the subdirectory, avoiding performing the I/O operation by the program.

9. A system, comprising:
a memory; and
a processor coupled to the memory, wherein the processor performs operations, the operations comprising:
mounting a new file system to a subdirectory of an existing file system;
storing a sentinel indicator in the subdirectory, wherein the sentinel indicator is created by an automated program, wherein all sentinel indicators are referred to by an identical filename and an identical filename extension, and wherein the sentinel indicator and at least one other file are stored in the subdirectory that comprises a mount point of the new file system;
in response to determining by a program that the sentinel indicator exists in the subdirectory, performing an input/output (I/O) operation by the program.

10. The system of claim 9, wherein the subdirectory includes at least two files including the sentinel indicator and another file that is a file of the new file system.

11. A system, comprising:
a memory; and a processor coupled to the memory, wherein the processor performs operations, the operations comprising:

mounting a new file system to a subdirectory of an existing file system;

storing a sentinel indicator in the subdirectory, wherein all sentinel indicators are referred to by an identical filename and an identical filename extension, and wherein the sentinel indicator and at least one other file are stored in the subdirectory that comprises a mount point of the new file system; and in response to determining by a program that the sentinel indicator exists in the subdirectory, performing an input/output (I/O) operation by the program, wherein the identical filename and the identical filename extension are predetermined and are made available to programs to determine whether the sentinel indicator exists.

12. The system of claim 11, the operations further comprising:

in response to determining by the program that the sentinel indicator does not exist in the subdirectory, avoiding performing the I/O operation by the program.

* * * * *